(12) United States Patent
Stringer (10) Patent No.: US 7,076,696 B1
(45) Date of Patent: Jul. 11, 2006

(54) PROVIDING FAILOVER ASSURANCE IN A DEVICE

(75) Inventor: Fred M. Stringer, Freehold, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 537 days.

(21) Appl. No.: 10/224,116

(22) Filed: Aug. 20, 2002

(51) Int. Cl.
*G06F 11/00* (2006.01)

(52) U.S. Cl. .............................. 714/47; 714/4; 714/41

(58) Field of Classification Search .................... 714/4, 714/41, 47
See application file for complete search history.

(56) References Cited

U.S. PATENT DOCUMENTS

| | | | | |
|---|---|---|---|---|
| 5,680,326 A | * | 10/1997 | Russ et al. ..................... 714/4 |
| 5,848,230 A | * | 12/1998 | Walker ........................... 714/7 |
| 6,055,647 A | * | 4/2000 | Lacombe et al. ............... 714/14 |
| 6,658,586 B1 | * | 12/2003 | Levi .............................. 714/4 |
| 6,789,114 B1 | * | 9/2004 | Garg et al. ................. 709/224 |
| 6,826,715 B1 | * | 11/2004 | Meyer et al. ................. 714/37 |
| 2004/0153869 A1 | * | 8/2004 | Marinelli et al. ............. 714/47 |

* cited by examiner

*Primary Examiner*—Robert Beausoliel
*Assistant Examiner*—Michael Maskulinski
(74) *Attorney, Agent, or Firm*—Straub & Pokotylo; John C. Pokotylo, Esq.

(57) ABSTRACT

A desired level of failover in a system is ensured by (i) capturing information about elements, such as components, modules, sub-systems, data, programs, routines, and/or information, etc. (referred to generally as "elements"), (ii) determining whether failover is compromised to an unacceptable degree, and (iii) persistently reporting compromised failover until proper remedial actions are taken.

28 Claims, 7 Drawing Sheets

PROVIDING FAILOVER ASSURANCE IN A DEVICE

§ 1. BACKGROUND OF THE INVENTION

§ 1.1 Field of the Invention

The present invention concerns ensuring that failover mechanisms in a device are not compromised to an unacceptable degree. More specifically, the present invention concerns monitoring failover mechanisms and, upon detecting actual or imminent or likely failure of a failover mechanism, reporting the failure.

§ 1.2 Related Art

The description of art in this section is not, and should not be interpreted to be, an admission that such art is prior art to the present invention.

Use of high-availability devices is especially important in real-time or mission-critical environments where outages can be devastating. For example, in telecommunications "five nines" availability is often required, meaning that the data transport mechanism must be up and running 99.999% of the time. Network equipment in particular must be designed for high availability, and is therefore often built using failover elements.

A high-availability device often includes failover elements that are in a standby mode. The failover elements are used when one or more primary elements in the device fails. A failover element may be identical to the primary element, thus providing full redundancy of the primary element, or may be an element that, although not identical to the primary element, serves to support the functions of the primary element when the primary element fully or partially fails. A single failover element may serve to failover one or more primary elements.

One example of network equipment requiring high availability is data forwarding devices, such as routers and switches. A basic function of these devices is to forward data received at their input lines to the appropriate output lines. Switches, for example, may be configured so that data received at input lines are provided to appropriate output lines. Switches are typically used in circuit-switched networks, in which a "connection" is maintained for the duration of a "call" (a communications session between two devices). If one or more elements in the switch fails and there is no failover element for the failed primary elements, the circuit may be broken and would need to be set up again.

In packet switched networks, addressed data (referred to as "packets" in the specification without loss of generality), are typically forwarded on a best efforts basis, from a source to a destination. Many packet switched networks are made up of interconnected nodes (referred to as "routers" in the specification below without loss of generality). The routers may be geographically distributed throughout a region and connected by links (e.g., optical fiber, copper cable, wireless transmission channels, etc.). In such a network, each router typically interfaces with multiple links.

Packets may traverse the network by being forwarded from router to router until they reach their destinations (specified by, for example, layer-3 addresses in the packet headers). Unlike switches, which establish a connection for the duration of a "call" or "session" to send data received on a given input port out on a given output port, routers determine the destination addresses of received packets and, based on these destination addresses, determine for each packet the appropriate link or links on which the packet should be sent. Routers may use protocols to discover the topology of the network, and algorithms to determine the most efficient ways to forward packets towards a particular destinations. Packets sent from a source to a particular destination may be routed differently through the network, each taking a different path. Such packets can even arrive out of sequence.

Network outages may occur when elements (such as elements of network nodes, as well as links between such nodes) fail in the network. Failover elements may prevent an outage, but if both a primary element and its failover fail, the outage may occur. Failover mechanisms may become compromised in a variety of ways. The failover element may have either failed earlier and still been resident in the system (for example, if a primary element was not replaced after the system switched to the failover element), or may have failed months or weeks earlier and been removed for replacement but not yet been replaced. Consequently, what would otherwise be considered to be a robust and protected part of a system can become compromised to such a degree as to actually become a single point of failure. Such failures are avoidable since they are often the result of a breakdown in operations practices and procedures. As the foregoing examples illustrate, it is often unknown how much failover is present in communications networks.

Accordingly, there is a need to ensure that failover mechanisms are not compromised to an unacceptable degree in devices.

§ 2. SUMMARY OF THE INVENTION

The present invention provides failover assurance for a device or system including primary elements and failover elements. The present invention may do so by (a) generating a baseline configuration of the system, (b) generating a configuration instance of the system, (c) determining whether a desired degree of failover exists based on the baseline configuration of the system and the configuration instance of the system, and (d) reporting that the desired degree of failover does not exist if it is determined that a desired degree of failover does not exist.

In one embodiment, the configuration instance of the system includes conditions or parameters of the primary elements and failover elements included in the system.

The primary elements and failover elements may include modules, components, sub-systems, routines, data, and/or information. If the system is a data forwarding device, the primary elements and failover elements may include power supplies, fans, cooling impellers, control processors, routing engines, clocking modules, synchronization modules, switch modules, schedulers, memory modules, data storage devices, service modules for tunnel services, service modules for encryption services, logical configuration of secondary paths, logical configuration of backup label switched paths, and/or logical confirmation of backup nodes.

In one embodiment, determining whether a desired degree of failover exists based on the baseline configuration of the system and the configuration instance of the system is performed by comparing the configuration instance of the system to the baseline configuration of the system. In one embodiment, new configuration instances of the system are generated. Then, whether a desired degree of failover exists is re-determined based on the baseline configuration of the system and the new configuration instance of the system. If it is again determined that a desired degree of failover does not exist, then the fact that the desired degree of failover does not exist is again reported. Such reporting may persist until it is determined that a desired degree of failover exists. Such reports may be sent to multiple entities, based on a policy. The policy may specify a tiered reporting policy. Each of the multiple entities may be identified by an Internet protocol address.

In one embodiment, the baseline configuration of the system is generated when the system is initialized. If further primary elements or failover elements are added to the system, then an updated baseline configuration to reflect the added primary elements or failover elements may be generated.

The present invention may include methods, apparatus and data structures to provide such failover assurance.

§ 4. DETAILED DESCRIPTION

The principles of the invention are embodied in methods, apparatus, and/or data structures for providing assurance that failover mechanisms are not compromised or at risk (or do not remain so). The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, apparatus and methods consistent with the principles of the invention are not intended to be limited to the embodiments shown, and the inventor regards his invention as the principles embodied in the following disclosed and claimed methods, apparatus, data structures, and other patentable subject matter herein.

Functions that may be performed consistent with the principles of the invention are introduced in § 4.1 below. Then, exemplary operations, data structures, methods, and apparatus consistent with the principles of the invention are described in § 4.2. Then, an example of failover assurance in a router is described in § 4.3. Finally, some conclusions regarding the principles of the invention are provided in § 4.4.

§ 4.1 FUNCTIONS THAT MAY BE PERFORMED CONSISTENT WITH THE PRINCIPLES OF THE INVENTION

Functions consistent with the principles of the invention may include (i) capturing information about elements, including, for example, modules, sub-systems, data, programs, routines, and/or information, etc., or a combination of these (referred to generally as "elements"), (ii) determining whether failover is compromised to an unacceptable degree, and (iii) reporting compromised failover until a condition is met, such as until sufficient remedial actions are taken to remedy the compromised failover.

§ 4.2 EXEMPLARY OPERATIONS, METHODS, DATA STRUCTURES AND APPARATUS

Figure 1:
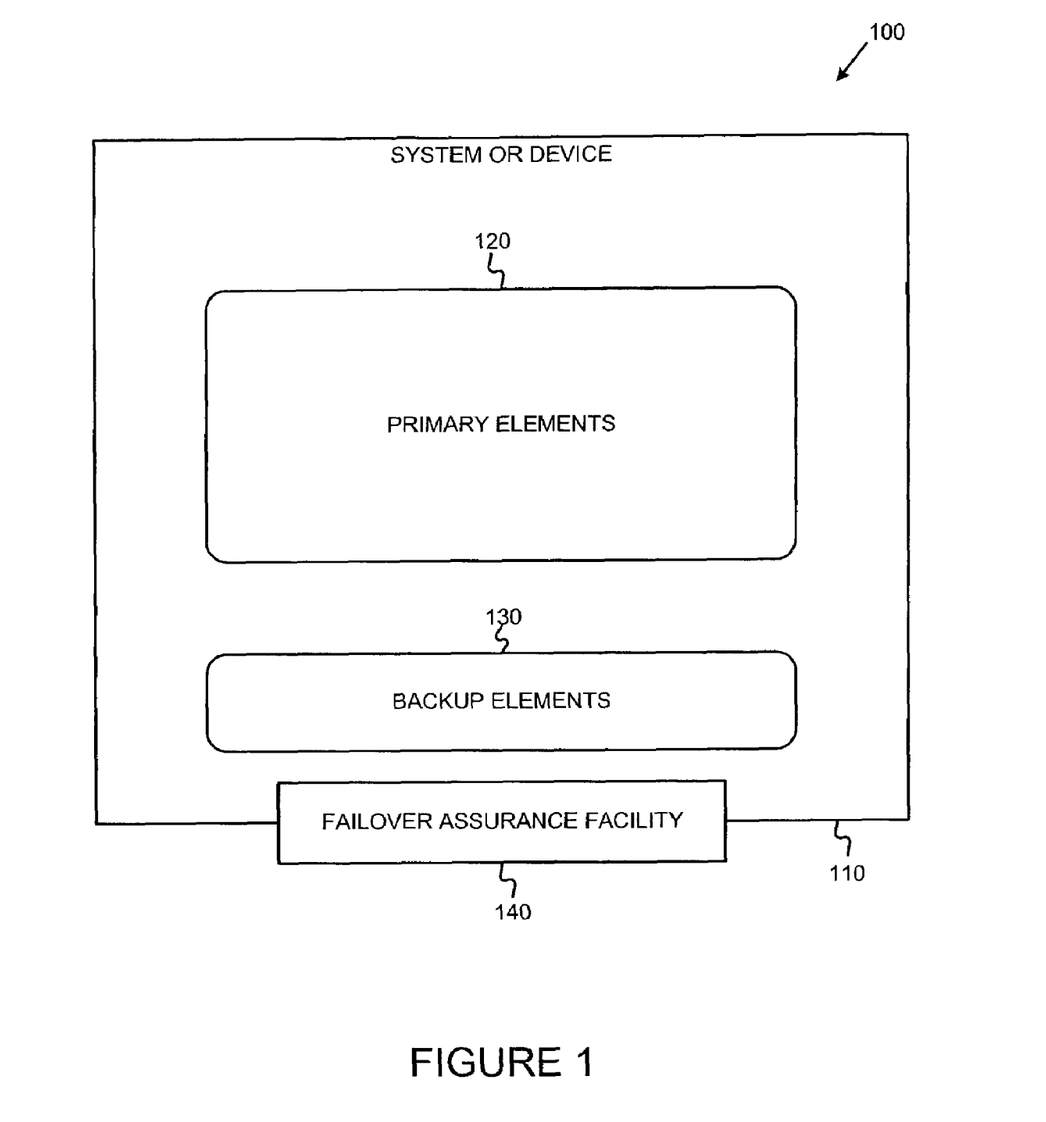
FIG. 1 is a diagram of an environment in which apparatus and methods consistent with the principles of the invention may be used.

FIG. 1 is a diagram of an environment 100, including a system or device 110 (referred to in the specification as a "device" without loss of generality), in which principles of the invention may be used. Device 110 may include one or more primary elements 120. Primary elements 120 may include any element in the system, such as a module, sub-system, data, program, routine, or information, etc., or some combination of these. At least some of primary elements 120 may have one or more corresponding failover elements 130. Typically, primary elements 120 act as "active" elements, while failover elements 130 act as "redundant" elements or "standby" elements. Each failover element 130 can backup one or more of the primary elements 120. The failover assurance facility 140 operates consistent with the principles of the present invention. Failover assurance facility 140 may be included within the device 110, or may be external to, but used with, the device 110.

Operations that may be performed consistent with the principles of the invention are described in § 4.2.1. Then, exemplary methods and data structures that may be used to carry out such operations are described in § 4.2.2. Finally, exemplary hardware that may be used to carry out such operations are described in § 4.2.3.

§ 4.2.1 Exemplary Operations Related to Failover Assurance

Figure 2:
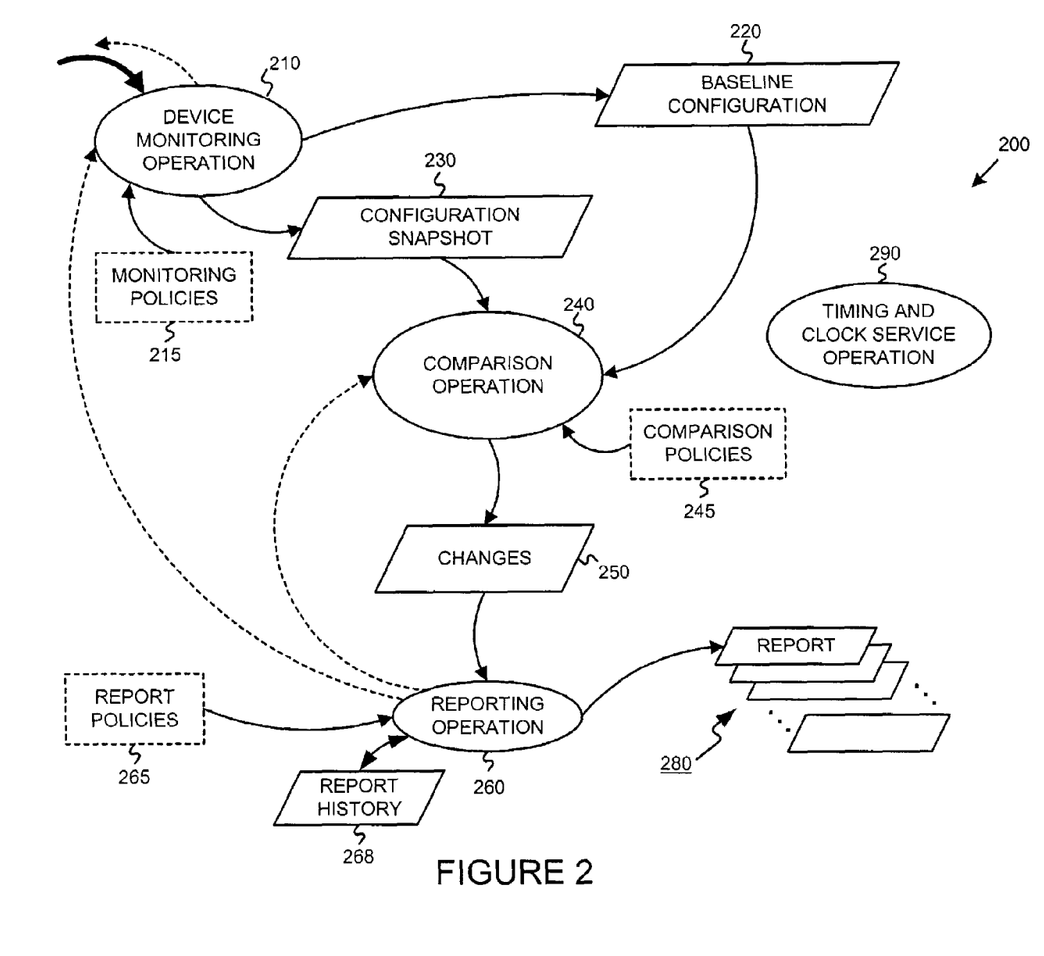
FIG. 2 is a bubble chart diagram of operations that may be performed in accordance with the principles of the invention.

FIG. 2 is a bubble diagram that illustrates exemplary failover assurance facility 200. As shown, failover assurance facility 200, may include (or interact with) a device monitoring operation 210, a comparison operation 240, and a reporting operation 260. Device monitoring operation 210 may be used to monitor various elements of device 110. Such monitoring may be done in accordance with monitoring policies 215. Based on such monitoring, a baseline configuration 220 and a configuration snapshot 230 may be generated. Basically, a baseline configuration 220 or configuration snapshot 230 may include an indication of primary elements 120 and failover elements 130 of the device 110, and may also include characteristics (e.g., state) or parameters associated with such primary elements 120 and failover elements 130. As shown, comparison operation 240 generates a list of changes 250. Such comparison and change list generation may be done in accordance with comparison policies 245. Changes 250 may be from baseline configuration 220 to configuration snapshot 230. The changes may be limited to critical changes, and may include changes to elements, element parameters or characteristics, etc. Preferably, changes 250 may include changes which compromise a desired degree of failover protection. Finally, reporting operation 260 may generate and transmit one or more reports 280 based on changes 250 and reporting policies 270, as well as based on a history of prior reports 268, if any. Timing and clock service operation 290 may be used by one or more of the above operations.

Various exemplary methods for carrying out the operations and various exemplary data structures for storing the information are now described in § 4.2.2.

Figure 3:
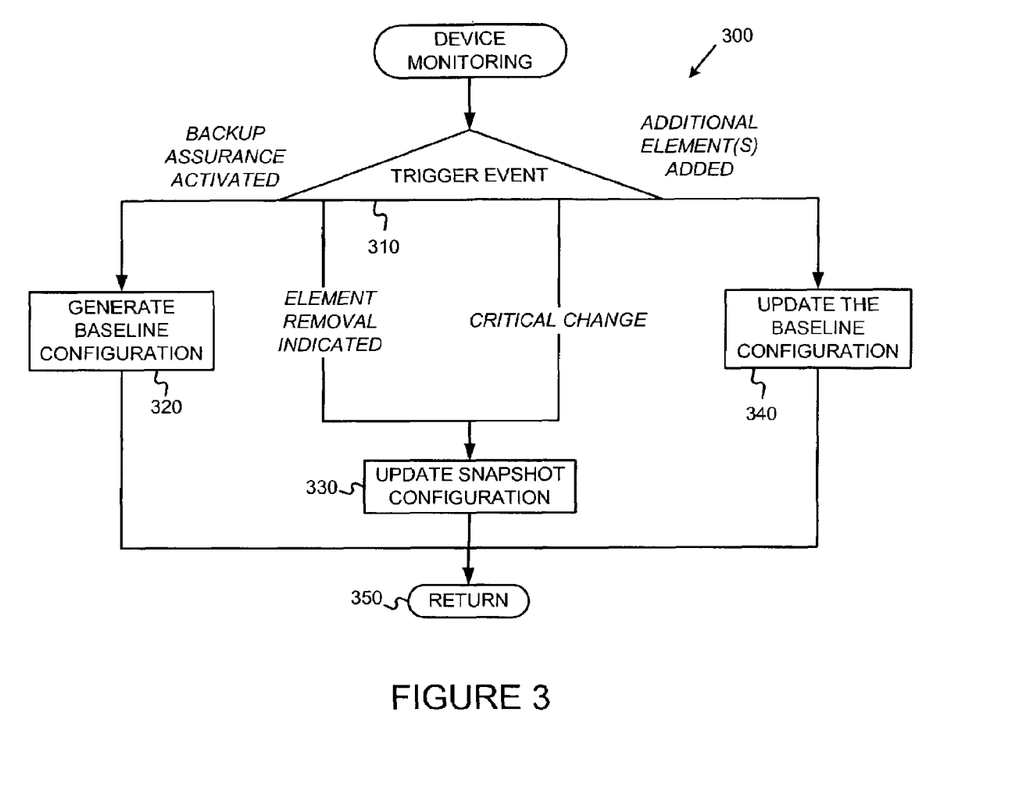
FIG. 3 is a flow diagram of an exemplary method that may be used to carry out device monitoring operations.

§ 4.2.2 Exemplary Methods and Data Structures for Comparison and Reporting Operations FIG. 3 is a flow diagram of an exemplary device monitoring method 300 that may be used to perform device monitoring operations 210. Trigger event 310 provides various branches of device monitoring method 300, that may be performed in response to various "trigger events." For example, if a failover assurance feature is activated (e.g., automatically upon startup of the device, or manually), a baseline configuration is generated (block 320), before device monitoring method 300, is left via RETURN node 350.

If trigger event 310 receives an indication that an element is removed, or that there is a critical change to an element parameter or characteristic (e.g., an element becomes inoperable or unreliable), a snapshot configuration (such as a configuration instance) is updated, or a new snapshot configuration (configuration instance) is generated, (block 330), before device monitoring method 300, is left via RETURN node 350.

If one or more additional elements are added to the device (e.g., if a further failover element is added), then the baseline configuration is updated to reflect this fact (block 340), before device monitoring method 300, is left via RETURN node 350.

Figure 4:
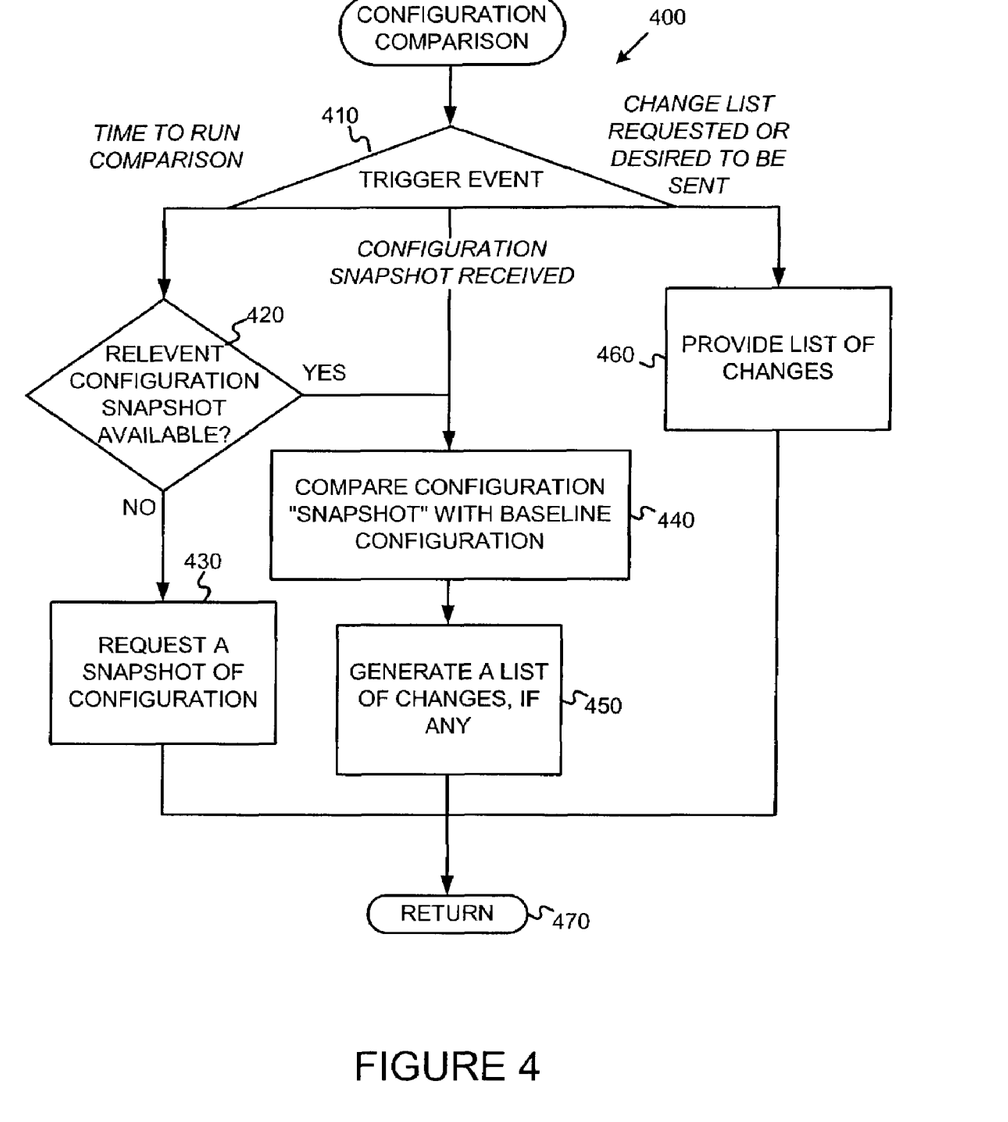
FIG. 4 is a flow diagram of an exemplary method that may be used to carry out comparison operations.

FIG. 4 is a flow diagram of an exemplary comparison method 400 that may be used to perform configuration comparison operations 240. Trigger event 410 provides various branches of comparison method 400 that may be performed upon the occurrence of various conditions or "trigger events." For example, if trigger event 410 receives an indication that it is time to run a comparison, it is determined whether or not a relevant configuration snapshot, such as a configuration instance, is available (block 420). If not, a snapshot of the configuration may be requested from, for example, from system monitoring (block 430), before comparison method 400 is left via RETURN node 470. If, on the other hand, a relevant configuration snapshot is available, then it is compared with the baseline configuration (block 440), and a list of changes, if any, is generated (block 450), before comparison method 400, is left via RETURN node 470. In one embodiment, the list only includes critical changes that indicate important changes. The comparison and list generation may be done in accordance with a policy. For example, the changes may include changes that compromise a desired degree of failover.

If a configuration snapshot is indicated as being received by trigger event 410 (and it indicates that such receipt is a request to generate a change list), comparison method 400, proceeds to blocks 440 and 450, just described above, before comparison method 400 is left via RETURN node 470.

If trigger event block 410 receives an indication that a change list is requested or desired to be sent (and a change list has already been generated and is available), the list of changes is provided (block 460), before comparison method 400, is left via RETURN node 470. In one embodiment, the list includes only critical changes that are important to the determination of failover assurance. The list of changes may be provided to any element in device 110, or an external device, or both.

In one embodiment, only primary elements considered to be critical, such as primary elements with failover elements, are checked. If a primary element or its associated failover element fails or is compromised to an unacceptable degree, this may be indicated in the critical change list. For example, if an active module has a failover standby module, and the standby module fails, the critical change list should reflect this failure, which would otherwise be a "silent failure."

Figure 5:
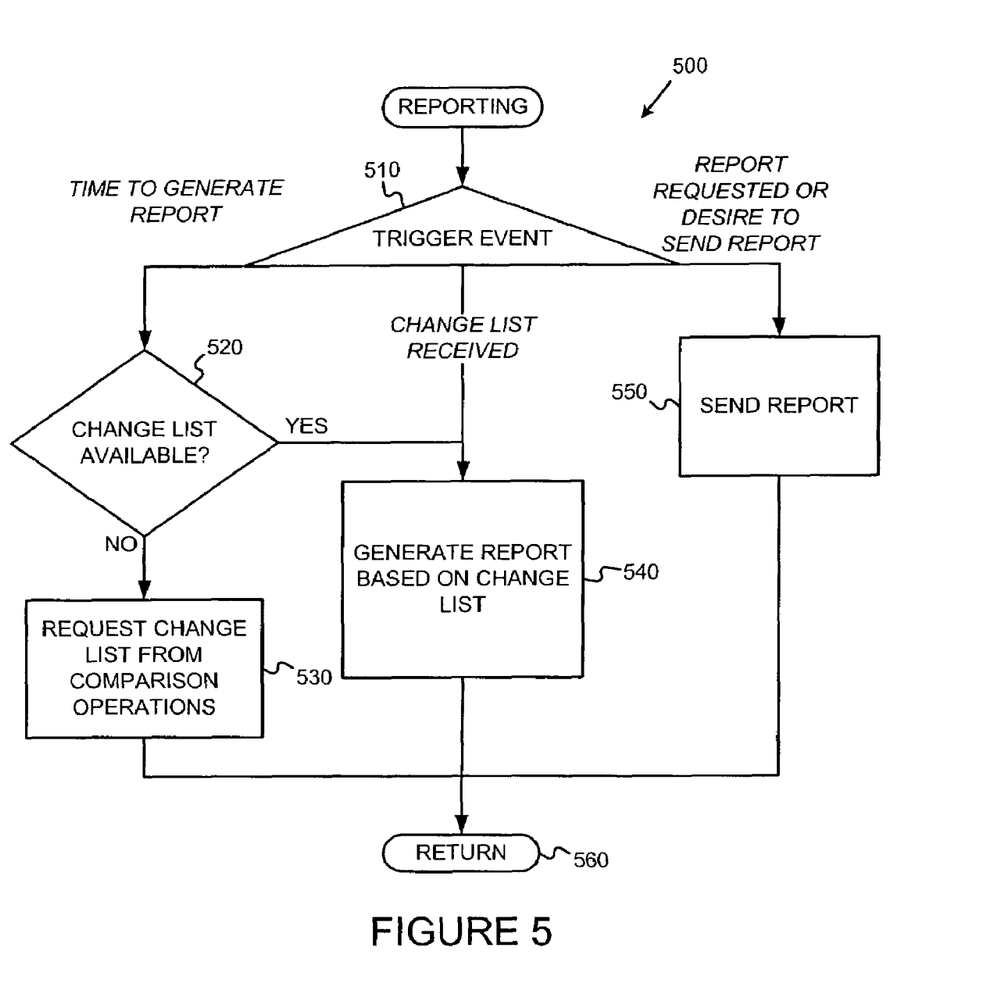
FIG. 5 is a flow diagram of an exemplary method that may be used to carry out failover assurance reporting operations.

FIG. 5 is a flow diagram of an exemplary reporting method 500 that may be used to perform failover assurance reporting operations 260. Various branches of reporting method 500, may be performed upon the occurrence of various conditions or "trigger events" (block 510). For example, if it is time to generate a report, it is determined whether or not a change list is available (block 520). The change list may include all changes, or only those considered "critical," as defined by some criteria. The time to generate a report may be indicated by one or more elements or processes internal or external to device 110. If a change list is not available, a change list may be requested (block 530) (e.g., from comparison operation 240), before reporting method 500 is left via RETURN node 560. If, on the other hand, a change list is available, then a report is generated based on the change list (block 540), before reporting method 500 is left via RETURN node 560. The report may be generated in accordance with a policy. The policy may take report history into account.

If trigger event 510 receives a change list indication (and such receipt is a request to generate a report), reporting method 500 proceeds to block 540, described above, before reporting method 500 is left via RETURN node 560.

If trigger event 510 receives an indication that a report is requested or desired to be sent (and a report has already been generated and is available), the report is sent (block 550), before reporting method 500 is left via RETURN node 560.

Reporting method 500 may support sending multiple copies of the report to multiple locations, and may send reports to locations based on certain criteria. In one embodiment, each location may be defined by a unique network address, such as internet protocol (IP) address or an email account. In this way, in addition to alerting an operations organization to the failover risk, other entities such as a surveillance organization, a management group, and/or a tier support organization may also be alerted.

Messages issued by reporting method 500 may be persistent. For example, reporting operation may issue messages at user-defined intervals (e.g., every 12 or 24 hours) until the problem is resolved. In one embodiment, the reporting feature cannot be disabled or deactivated once it is activated—only installing one or more elements that return the device back to its desired degree of failover will cause the messages to stop. In such an instance, a final message acknowledging that failover assurance of critical elements has been restored may be provided.

In one embodiment, reporting method 500 may provide tiered messaging so that the initial message or messages are sent to a first entity or set of entities (e.g., those responsible for remedying the compromised failover). Later, if the problem remains unresolved, reporting method 500 may provide messages to a second entity or set of entities, which may include the first entity or set of entities. Tiered messaging allows festering problems to come to the attention of those with more authority or motivation to remedy the compromised failover.

Report policies 265 may correlate the severity of the compromised failover with the interval period at which reports are sent by reporting method 500, and/or the intended recipients of the reports.

§ 4.2.3 Exemplary Apparatus

Figure 6:
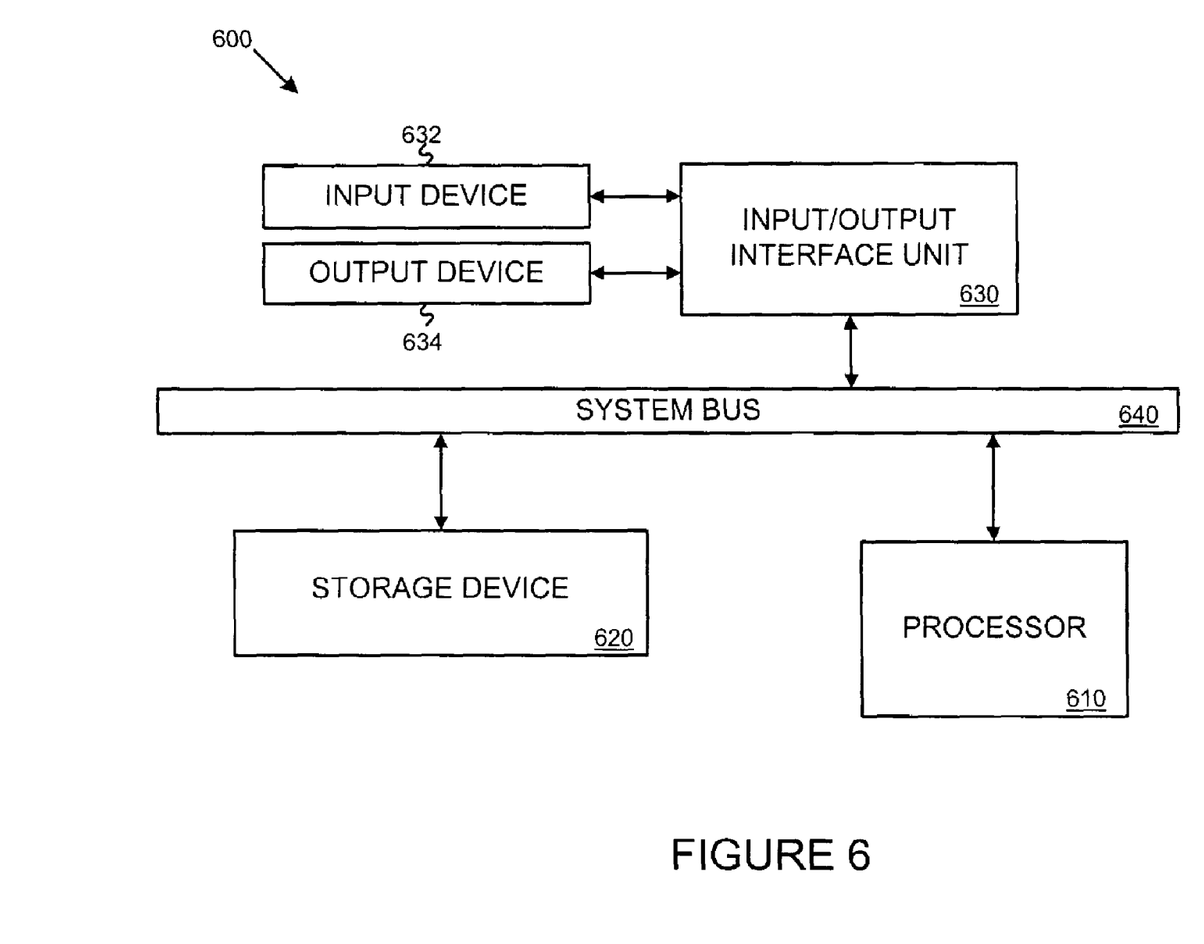
FIG. 6 is a block diagram that illustrates an exemplary machine that may be used to carry out various operations consistent with the principles of the invention.

FIG. 6 is block diagram of a machine 600 which may effect one or more operations consistent with the principles of the invention, and store one or more of the data structures, discussed above. Machine 600 basically includes a processor 610, an input/output interface unit 630, a storage device 620, and a system bus 640 for facilitating the communication of information among the coupled elements. System bus 640 may be implemented using any type of element for transferring information, such as a parallel bus or a network. For example, Ethernet could be used in machine 600 to transfer information among the elements. System bus 640 may be implemented as one or more types of data transfer elements.

An input device 632 and an output device 634 may be coupled with input/output interface 630. Each device of machine 600 represents one or more devices that perform operations consistent with the principles of the invention. For example, storage device 620 may include a single hard drive, multiple hard drives, other memory devices, or a combination of these. Operations consistent with the principles of the invention, as described above with respect to FIGS. 1–5, may be effected by processor 610 executing instructions. The instructions may be stored in storage device 620, received via input/output interface 630, or a combination of these. The instructions may be functionally grouped into processing modules.

§ 4.3 EXAMPLE OF FAILOVER ASSURANCE IN A ROUTER

Machine 600 may be a router, or may be included within a router, for example. An exemplary router, such as those sold by Juniper Networks of Sunnyvale, Calif., may include a forwarding part and a routing part. The forwarding part operates to forward packets based on forwarding information, such as a forwarding table. Since it is often desired that the forwarding part operate at high-speeds, it may be largely implemented in hardware. The routing part generates a routing table, and generates forwarding information from the routing table. Since it is often desired that the routing part be adaptable to support new and evolving protocols, it may be largely implemented in software, or a combination of hardware and software. Consequently, other software processes and hardware may also be supported by the routing part.

For example, a packet arriving at input device 632 may be passed by input/output interface 630 to storage 620. Before sending the packet to storage, input/output interface 630 extracts information from the packet and sends the information to processor 610. Processor 610 uses the information to determine forwarding information, and sends the packet to a particular input/output interface unit 630 based on the forwarding information. Input/output interface unit 630 retrieves the packet from storage device 620, and sends the packet out of machine 600 via output device 634.

Processor 610 also performs failover assurance in a manner consistent with the principles of the invention, as exemplified in FIGS. 1–5. For example, any one or more of input device 632, output device 634, input/output interface unit 630, and storage device 620 may have failover elements. Processor 610 monitors the devices and their failover elements for failover assurance. In another embodiment, a device other than processor 610, such as another processor or software process, which may also have a failover, performs failover assurance.

Figure 7:
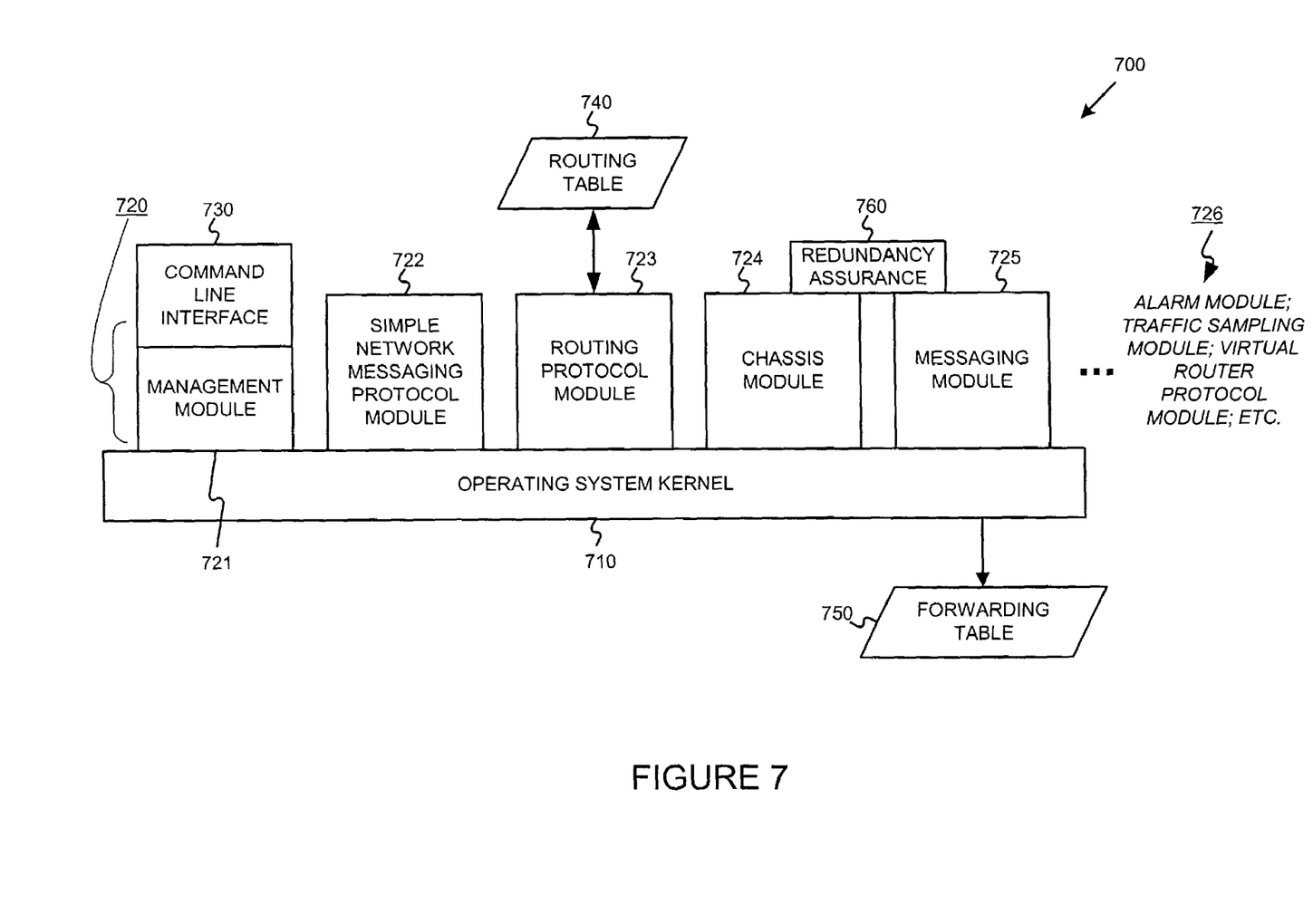
FIG. 7 is a block diagram that illustrates an exemplary routing engine environment in which apparatus and methods consistent with the principles of the invention may be used.

FIG. 7 illustrates an exemplary software architecture 700 which may be used in a routing part of a router, as well as how the failover assurance element of the present invention may be used in conjunction with such an exemplary software architecture. An operating system kernel 710 is used by various modules (e.g., daemons) such as, for example, a management module 721 (which may be accessed via a command line interface 730), a simple network messaging protocol ("SNMP") module 722, a routing protocol module 723 (which may generate routing information such as a routing table 740), a chassis module 724, a messaging module 725 and various other modules (e.g., an alarm module, a traffic sampling module, a virtual router failover protocol module, etc.) 726. This software ultimately generates forwarding information, such as forwarding table 750.

The chassis module 724 may allow one to access and monitor elements belonging to the router, such as interface cards, fans, power supplies, clocks, boards, controllers, switch modules, schedulers, memory modules, data storage devices, service modules for services like tunnels or encryption, etc. Collectively, such elements may define, at least a part of, a configuration of the router. The router may include failover elements such as, for example, power supplies, fans, cooling impellers, control processors, routing engines, clock modules, synchronization modules, switch modules, schedulers, service modules for services like tunnels or encryption, etc.

The monitoring is not restricted to only hardware elements in the system. Logical configurations that comprise critical failover mechanisms may also monitored. In the context of network equipment for example, some communications protocols have redundant elements to be used in the event of a link of a route or path going down, or in the event of a node going down. For example, the monitoring operations can obtain a view of SONET/SDH automatic protection system ("APS") (in which interfaces corresponding to a primary path and a secondary path are configured). Similarly, the monitoring operations can obtain a view of fast reroute backup label switched paths ("LSPs"). Similarly, the monitoring operations can obtain a view of generalized multi-protocol label switching ("GMPLS") paths that are labeled as backup or restoration paths. The monitoring operations can also obtain a view of backup routers used in the virtual router redundancy protocol ("VRRP"). Redundant synchronization inputs from a system like the Building Integrated Timing System ("BITS") can be monitored as well.

It should be understood that other embodiments consistent with the principles of the invention may also be implemented without departing from the spirit and scope of the invention. For example, although elements have been described as primary elements and failover elements, it should be understood that a failover element may become a primary element upon failure of the primary element it backs up. When the failed primary element is repaired or replaced, it may then be considered the failover element, backing up the failover element that became the primary element.

Moreover, an element may be any element in a device or system that takes part in operation of the device or system. The element may be a hardware element, software element, module, subsystem, component, or a combination of these. A failover element may be an exact duplicate of the primary element it backs up, or may be any element responsible for handling some aspect of a failure of a primary element.

As shown, in one embodiment of the present invention, a failover assurance software module 760 may use the services of the chassis module 724 (e.g., to perform or support at least a part of the device monitoring operation 210) and a messaging module 725 (e.g., to perform or support at least a part of the reporting operations).

In the exemplary router implementation, during system boot, system configuration checks for activation of "failover assurance" feature. If active, a configuration monitor (e.g., a software module in the operating system or a routine in an existing module—recall device monitoring operation 210 of FIG. 2) is started and it gets a system configuration from the chassis module 724. The configuration monitor maintains that "instance" of the elements installed in the system. Note that the monitoring policies 215 may limit such monitoring to elements deemed critical. Accordingly, the configuration monitored may actually be a sub-set of the configuration of the entire system.

Periodically, (e.g., every 24 hours) the monitor obtains a new "instance" or "snapshot" configuration and compares it to the baseline configuration. (If failover elements are added, or failover features are configured, such new failover elements or failover features are added to the baseline configuration. Preferably, on the other hand, elements cannot be removed from the baseline configuration (unless the system is rebooted or reinitialized).) If the new instance of the configuration is missing an element that is in the baseline configuration, a message may be created. In one embodiment, this comparison is not a real-time process, and does not supersede, replace or obviate any existing alarms, events, alerts or syslog messaging. The message should identify the missing or failed element or feature, and should identify the system or device, particularly in applications in which multiple systems are deployed.

In one embodiment, the message is placed in a message spool permanently. Every time the spool is sent, the permanent messages are sent again. In one embodiment, there is no mechanism for clearing or halting the message—it continues to be reported until the configuration instance matches the baseline configuration. Thus, in such an embodiment, reporting persists until the system or device is fixed (e.g., until failover is restored).

Further, in one embodiment, there is no mechanism for removing an element from the baseline configuration, and new elements are automatically added to an updated baseline configuration. In such an embodiment, elements may be removed from the baseline configuration by (1) deactivating the element or feature in the system configuration, (2) removing any failover elements that are desired to be removed from the configuration, and (3) rebooting the system. Warm reboot (switching routing engines) preferably does not generate a new configuration instance.

Naturally, the operations of the present invention may be effected on systems other than routers, or on routers other than the exemplary router. Such other systems may employ different hardware and/or software.

§ 4.4 CONCLUSIONS

As can be appreciated from the foregoing disclosure, the present invention mitigates situations where a failure of one or more elements (e.g., modules, elements or subassemblies) can leave a system or device vulnerable, yet not be detected (hidden or silent failures), or ignored. Further, network operators will no longer have to rely on operational procedures and practices with offline records and notes in trouble tickets to track compromises in the failover of critical elements. A system using the present invention can automatically track such problems and report them persistently until resolved. Since messages are sent periodically and persistently until the situation is resolved, and cannot be deactivated, they will serve as a constant reminder that the network is being run at risk without the defined failover.

What is claimed is:

1. A method for use in or with a system including primary elements and failover elements, the method comprising:

a) generating a baseline configuration of the system;

b) generating a configuration instance of the system;

c) determining whether a desired degree of failover exists based on the baseline configuration of the system and the configuration instance of the system;

d) if it is determined that a desired degree of failover does not exist, then reporting that the desired degree of failover does not exist;

e) generating a new configuration instance of the system;

f) re-determining whether a desired degree of failover exists based on the baseline configuration of the system and the new configuration instance of the system; and g) if it is again determined that a desired degree of failover does not exists, then reporting that the desired degree of failover does not exist, wherein the act of reporting that the desired degree of failover does not exist persists until it is determined that a desired degree of failover exists.

2. The method of claim 1 wherein the configuration instance of the system includes conditions or parameters of the primary elements and failover elements included in the system.

3. The method of claim 1 wherein the primary elements and failover elements include at least one of modules, components, sub-systems, routines, data, and information.

4. The method of claim 1 wherein the system is a data forwarding device and wherein the primary elements and failover elements include at least one of power supplies, fans, cooling impellers, control processors, routing engines, clocking modules, synchronization modules, switch modules, schedulers, memory modules, data storage devices, service modules for tunnel services, and service modules for encryption services.

5. The method of claim 1 wherein the act of determining whether a desired degree of failover exists based on the baseline configuration of the system and the configuration instance of the system is performed by comparing the configuration instance of the system to the baseline configuration of the system.

6. The method of claim 1 wherein the act of generating a baseline configuration of the system is performed when the system is initialized.

7. The method of claim 1 wherein the system is a data forwarding device and wherein the primary elements and failover elements include at least one of logical configuration of secondary paths, logical configuration of backup label switched paths, and logical confirmation of backup nodes.

8. A method for use in or with a system including primary elements and failover elements, the method comprising:

a) generating a baseline configuration of the system;

b) generating a configuration instance of the system;

c) determining whether a desired degree of failover exists based on the baseline configuration of the system and the configuration instance of the system; and d) if it is determined that a desired degree of failover does not exist, then reporting that the desired degree of failover does not exist, wherein the act of reporting that the desired degree of failover does not exist sends reports to multiple entities, based on a policy.

9. The method of claim 8 wherein the policy specifies a tiered reporting policy.

10. The method of claim 8 wherein each of the multiple entities are identified by an Internet protocol address.

11. The method of claim 8 further comprising:
   e) if further primary elements or failover elements are added to the system, then generating an updated baseline configuration to reflect the added primary elements or failover elements.

12. The method of claim 8 wherein the configuration instance of the system includes conditions or parameters of the primary elements and failover elements included in the system.

13. The method of claim 8 wherein the primary elements and failover elements include at least one of modules, components, sub-systems, routines, data, and information.

14. The method of claim 8 wherein the system is a data forwarding device and wherein the primary elements and failover elements include at least one of power supplies, fans, cooling impellers, control processors, routing engines, clocking modules, synchronization modules, switch modules, schedulers, memory modules, data storage devices, service modules for tunnel services, and service modules for encryption services.

15. The method of claim 8 wherein the act of determining whether a desired degree of failover exists based on the baseline configuration of the system and the configuration instance of the system is performed by comparing the configuration instance of the system to the baseline configuration of the system.

16. The method of claim 8 wherein the system is a data forwarding device and wherein the primary elements and failover elements include at least one of logical configuration of secondary paths, logical configuration of backup label switched paths, and logical confirmation of backup nodes.

17. An apparatus for use in or with a system including primary elements and failover elements, the apparatus comprising:
   a) an input for accepting a baseline configuration of the system and a configuration instance of the system;
   b) comparison facility for determining whether a desired degree of failover exists based on the baseline configuration of the system and the configuration instance of the system; and
   c) a reporting facility for reporting that the desired degree of failover does not exist if it is determined that a desired degree of failover does not exist,
   wherein the input accepts new configuration instances of the system,
   wherein the comparison facility re-determines whether a desired degree of failover exits based on the baseline configuration of the system and the new configuration instance of the system, and
   wherein the reporting facility repeatedly reports that the desired degree of failover does not exist until the comparison facility determines that the desired degree of failover exists.

18. The apparatus of claim 17 wherein the configuration instance of the system includes conditions or parameters of the primary elements and failover elements included in the system.

19. The apparatus of claim 17 wherein the primary elements and failover elements include at least one of modules, components, sub-systems, routines, data, and information.

20. The apparatus of claim 17 wherein the system is a data forwarding device and wherein the primary elements and failover elements include at least one of power supplies, fans, cooling impellers, control processors, routing engines, clocking modules, synchronization modules, switch modules, schedulers, memory modules, data storage devices, service modules for tunnel services, and service modules for encryption services.

21. The apparatus of claim 17 wherein the system is a data forwarding device and wherein the primary elements and failover elements include at least one of logical configuration of secondary paths, logical configuration of backup label switched paths, and logical confirmation of backup nodes.

22. An apparatus for use in or with a system including primary elements and failover elements, the apparatus comprising:
   a) an input for accepting a baseline configuration of the system and a configuration instance of the system;
   b) comparison facility for determining whether a desired degree of failover exists based on the baseline configuration of the system and the configuration instance of the system; and
   c) a reporting facility for reporting that the desired degree of failover does not exist if it is determined that a desired degree of failover does not exist,
   wherein the reporting facility sends reports that the desired degree of failover does not exist to multiple entities, based on a policy.

23. The apparatus of claim 22 wherein the policy specifies a tiered reporting policy.

24. The apparatus of claim 22 wherein each of the multiple entities are identified by an Internet protocol address.

25. The apparatus of claim 22 wherein the configuration instance of the system includes conditions or parameters of the primary elements and failover elements included in the system.

26. The apparatus of claim 22 wherein the primary elements and failover elements include at least one of modules, components, sub-systems, routines, data, and information.

27. The apparatus of claim 22 wherein the system is a data forwarding device and wherein the primary elements and failover elements include at least one of power supplies, fans, cooling impellers, control processors, routing engines, clocking modules, synchronization modules, switch modules, schedulers, memory modules, data storage devices, service modules for tunnel services, and service modules for encryption services.

28. The apparatus of claim 22 wherein the system is a data forwarding device and wherein the primary elements and failover elements include at least one of logical configuration of secondary paths, logical configuration of backup label switched paths, and logical confirmation of backup nodes.

* * * * *